(12) United States Patent
Seufert et al.

(10) Patent No.: US 10,097,055 B2
(45) Date of Patent: Oct. 9, 2018

(54) PERMANENTLY-EXCITED DYNAMOELECTRIC MACHINE

(71) Applicant: SIEMENS AKTIENGESELLSCHAFT, München (DE)

(72) Inventors: Reiner Seufert, Salz (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 136 days.

(21) Appl. No.: 14/840,882

(22) Filed: Aug. 31, 2015

(65) Prior Publication Data

US 2016/0065016 A1 Mar. 3, 2016

(30) Foreign Application Priority Data

Sep. 1, 2014 (EP) .................................. 14183004

(51) Int. Cl.
| | |
|---|---|
| *H02K 21/12* | (2006.01) |
| *H02K 1/27* | (2006.01) |
| *F03D 9/25* | (2016.01) |
| *H02K 1/30* | (2006.01) |
| *H02K 1/16* | (2006.01) |
| *F03D 15/00* | (2016.01) |

(52) U.S. Cl.
CPC .............. *H02K 1/276* (2013.01); *F03D 9/25* (2016.05); *F03D 15/00* (2016.05); *H02K 1/16* (2013.01); *H02K 1/278* (2013.01); *H02K 1/30* (2013.01)

(58) Field of Classification Search
CPC ...... H02K 1/276; H02K 1/2766; H02K 1/278; H02K 5/22

USPC ........................... 310/156.01–156.84; 290/55
See application file for complete search history.

(56) References Cited

U.S. PATENT DOCUMENTS

| | | | |
|---|---|---|---|
| 4,327,302 A | 4/1982 | Hershberger | |
| 5,280,209 A | 1/1994 | Leupold et al. | |
| 6,717,315 B1 * | 4/2004 | Tajima | H02K 1/278 |
| | | | 310/156.45 |

(Continued)

FOREIGN PATENT DOCUMENTS

| | | |
|---|---|---|
| CH | 549 307 A | 5/1974 |
| CN | 101730970 B | 8/2012 |

(Continued)

OTHER PUBLICATIONS

Hitachi Metals reduces rare-earth dysprosium in electric-motor magnets, Ryan Gehm, Apr. 5, 2013, SAE International.*

*Primary Examiner* — Hanh Nguyen
(74) *Attorney, Agent, or Firm* — Henry M. Feiereisen LLC (57) ABSTRACT

A permanently-excited dynamoelectric machine includes a stator and a rotor supported for rotation about an axis. The stator has a winding system, which is embedded in grooves of a material forming a magnetic return path and interacts electromagnetically with permanent magnets of the rotor via an air gap between the stator and the rotor. The permanent magnets are disposed on the rotor, with each individual permanent magnet, on a side facing towards the air gap, having a North and South pole. The rotor, viewed in the circumferential direction, has a pole coverage by the permanent magnets of 100%, i.e. that the permanent magnets viewed in the circumferential direction, are arranged substantially without gaps.

19 Claims, 5 Drawing Sheets

(56) References Cited

U.S. PATENT DOCUMENTS

| | | | |
|---|---|---|---|
| 7,394,174 B2 * | 7/2008 | Blase | F02M 37/08 |
| | | | 310/156.05 |
| 7,501,728 B2 | 3/2009 | Knauff et al. | |
| 7,692,356 B2 | 4/2010 | Bott et al. | |
| 2004/0150283 A1 | 8/2004 | Calfo | |
| 2005/0012413 A1 | 4/2005 | Bott et al. | |
| 2005/0082940 A1 | 4/2005 | Knauff et al. | |
| 2006/0255894 A1 * | 11/2006 | Enomoto | H02K 15/03 |
| | | | 335/302 |
| 2006/0284506 A1 * | 12/2006 | Kim | H02K 1/2733 |
| | | | 310/156.13 |
| 2007/0170792 A1 | 7/2007 | Bott et al. | |
| 2008/0218007 A1 * | 9/2008 | Masuzawa | H01F 1/0578 |
| | | | 310/44 |
| 2008/0278018 A1 | 11/2008 | Achor | |
| 2011/0089782 A1 * | 4/2011 | Jeung | H02K 1/278 |
| | | | 310/156.46 |
| 2012/0038168 A1 * | 2/2012 | Morishita | H02K 3/12 |
| | | | 290/55 |
| 2015/0028708 A1 * | 1/2015 | Matsuoka | H02K 1/278 |
| | | | 310/156.07 |

FOREIGN PATENT DOCUMENTS

| | | |
|---|---|---|
| DE | 10 2006 017 233 A1 | 10/2007 |
| JP | 2003124019 A | 4/2003 |

* cited by examiner

PERMANENTLY-EXCITED DYNAMOELECTRIC MACHINE

CROSS-REFERENCES TO RELATED APPLICATIONS

This application claims the priority of European Patent Application, Serial No. 14183004.2, filed Sep. 1, 2014, pursuant to 35 U.S.C. 119(a)-(d), the disclosure of which is incorporated herein by reference in its entirety as if fully set forth herein.

BACKGROUND OF THE INVENTION

The present invention relates to a permanently-excited dynamoelectric machine.

The following discussion of related art is provided to assist the reader in understanding the advantages of the invention, and is not to be construed as an admission that this related art is prior art to this invention.

Permanently-excited dynamoelectric machines have permanent magnets on their rotors. Depending on the arrangement of the permanent magnets and their distribution on the rotor, a rotor with more or fewer poles is created. For certain areas of application small pole spacings are extremely sensible, but because of the manufacturability of this type of rotor, especially handling small permanent magnets, this is extremely complex and thus time-consuming. Furthermore these types of magnetic materials are attached to the rotor. However, the magnet material is not utilized 100%.

Furthermore a rotor can principally be constructed with magnetized magnet rings; However this is only possible with comparatively small diameters of the rotor. Even with magnetic rings which essentially follow a Halbach magnet arrangement, there is a comparatively high proportion of the magnet volume which is not actively used.

It would therefore be desirable and advantageous to provide an improved permanently-excited dynamoelectric machine to obviate prior art shortcomings and to create a magnet arrangement with small pole spacing, high air gap induction with simultaneously optimized magnet use, and yet with an inertia of the rotor that is comparatively small.

SUMMARY OF THE INVENTION

According to one aspect of the present invention, a permanently-excited dynamoelectric machine includes a rotor supported for rotation about an axis and having a circumference, permanent magnets disposed on the rotor about the circumference at a pole coverage of 100% substantially in the absence of a gap between adjacent one of the permanent magnets, and a stator having a winding system embedded in grooves of a material forming a magnetic return path and interacting electromagnetically with the permanent magnets of the rotor via an air gap between the stator and the rotor, with each of the permanent magnets having a North and South pole on a side facing towards the air gap.

The present invention resolves prior art problems by providing special permanent magnets having a lateral magnetization. In such cases one side of the individual permanent magnets has both poles, i.e. North and South pole. Advantageously in such cases the magnet material is reduced to the materials of the permanent magnet through which the field lines pass and no magnetic return path via a laminated core, as with classical permanent magnets, is necessary.

According to another advantageous feature of the present invention, the rotor can have a low-inertia structure in a torsion-proof manner with a shaft of the permanently-excited dynamoelectric machine to hold, fix and position the permanent magnets. A structure of comparatively low rotor inertia, i.e. the low-inertia structure of the rotor, bears the permanent magnets in the direction of the air gap of the dynamoelectric machine and on the other side is positioned on the shaft, especially on an amagnetic shaft, in a torsion-proof manner.

According to another advantageous feature of the present invention, the rotor can have a laminated configuration, with the permanent magnets being disposed on its surface. Thus, the rotor can still be embodied with a laminated core, with the permanent magnets being disposed in corresponding cutouts/depressions or on the surface of the rotor, so that a cylindrical rotor is produced which has a constant air gap to the stator of the permanently-excited dynamoelectric machine.

According to another advantageous feature of the present invention, the permanent magnets can have a lens-shaped, trapezoidal or shell-shaped configuration, such that, independently of a number of poles of the rotor, a section of the permanent magnets facing away from the air gap essentially follows a magnetic preferred direction. The permanent magnets can thus be configured as magnetic lenses or also as magnetic shells and disposed on the circumference of the rotor. As a result of the arrangement according to the invention, especially a pole coverage of 100% of the permanent magnets on the circumference of the rotor, a corresponding torque increase is created with simultaneous optimization of the magnet volume. This reduces manufacturing costs and makes it possible to manufacture rotors which can be embodied with a large diameter and also with low inertia. These high-pole rotors exhibit a high air gap induction and are thus equipped with a high torque.

Likewise a tapering and/or staggered arrangement of the magnetic poles, viewed over the axial length of the rotor, is possible.

Advantageously the permanent magnets are embodied as regards their side facing away from the air gap such that they follow a shape which embraces the magnetic preferred direction of this one permanent magnet.

According to another aspect of the present invention, a wind power plant includes a generator having a dynamoelectric machine which includes a rotor supported for rotation about an axis and having a circumference, permanent magnets disposed on the rotor about the circumference at a pole coverage of 100% substantially in the absence of a gap between adjacent one of the permanent magnets, and a stator having a winding system embedded in grooves of a material forming a magnetic return path and interacting electromagnetically with the permanent magnets of the rotor via an air gap between the stator and the rotor, with each of the permanent magnets having a North and South pole on a side facing towards the air gap.

Thus, a permanently-excited dynamoelectric machine according to the present invention can advantageously be used as wind power generator, since a high polarity and a corresponding high air gap induction are demanded there in order to convert the available wind into electrical energy highly efficiently. In such cases, both internal rotor generators and also external rotor generators are to be used. Advantageously, the generator can also be embodied as a direct drive or as a generator with upstream gearing. Likewise further applications for E-aircraft and E-cars are conceivable.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
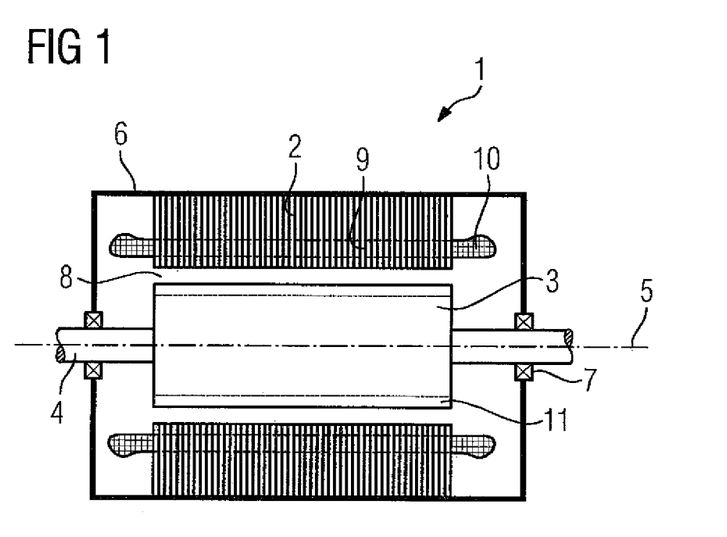
FIG. 1 shows a basic longitudinal section of a dynamoelectric machine according to the present invention.

Turning now to the drawing, and in particular to FIG. 1, there is shown a basic longitudinal section of a dynamo-electric machine according to the present invention, generally designated by reference numeral 1 and positioned in a housing 6. The dynamoelectric machine 1 can also be configured without housing. The housing 6 is supported via bearings 7 on a shaft 4 connected in a torsion-proof manner to a rotor 3. In operation of the dynamoelectric machine 1, the rotor rotates around an axis 5. A winding system 10 is disposed in grooves 9 running essentially axially in a stator 2 of the dynamoelectric machine 1. The winding system 10 forms winding heads on the end face sides of the stator 2. The winding system 10 is designed as an extended winding system or with toothed coils.

On its surface and on the side facing towards an air gap 8 between the rotor 3 and the stator 2, the rotor 3 has permanent magnets 11. Through electromagnetic interaction between the rotor 3 and its permanent magnets 11 with the winding system 10 of the stator 2, the dynamoelectric machine 1 either acts as a generator or as a drive motor.

Figure 2:
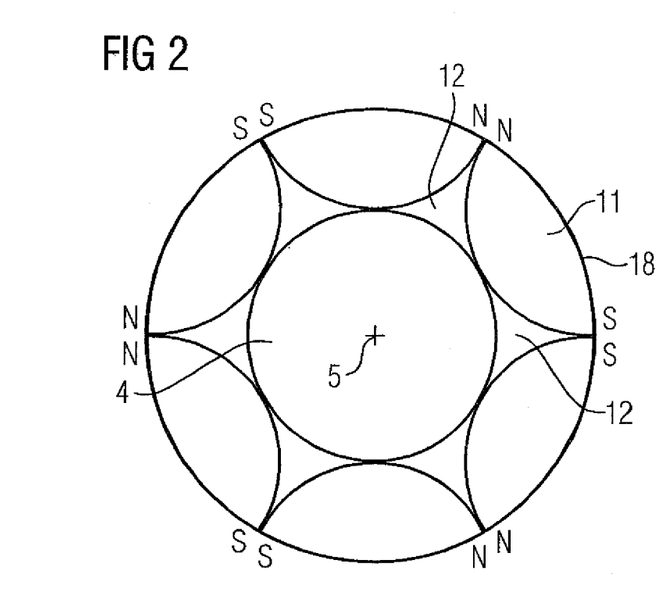
FIG. 2 shows a cross-section of a rotor.

FIG. 2 shows a cross section the rotor 3 with six poles formed by essentially asymmetrical lens-shaped permanent magnets 11. The permanent magnets 11 are magnetized laterally, i.e. a bar magnet of which the ends, i.e. the poles, are facing towards one another—in the extreme case are almost folded together—can be imagined in this regard.

Basically one magnetic pole N or S of the rotor 3 is thus formed by two poles of the permanent magnet 11 with the same name NN or SS lying next to one another.

These permanent magnets 11 are accommodated in an essentially star-shaped carrier structure 14, wherein, viewed in the circumferential direction, a volume 12 which is magnetically not active and does not contribute to torque generation is present between the permanent magnets 11. This volume 12 is disposed between the permanent magnets 11 in the direction of axis 5.

Figure 3:
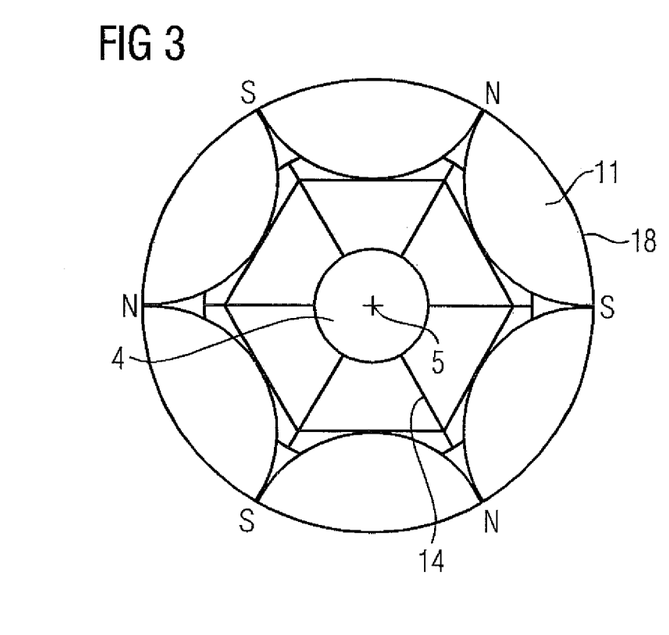
FIG. 3 shows a further cross-section of a rotor with a support structure.

FIG. 3 shows a further illustration of the rotor 3 with an arrangement of the lens-shaped permanent magnets 11 in a spoke-like carrier structure 14. This is positioned in a torsion-proof manner on the shaft 4 and is thus disposed for rotation around the axis 5. On the outer circumference of the rotor 3, viewed in the circumferential direction, North and South poles thus occur alternately. Through the spoke-type carrier structure 14 the moment of inertia is reduced compared to comparatively constructed rotors with conventional permanent magnets and magnetic material can be saved in the volume 12, so that the inertia further reduces. Furthermore this structure allows low-cost production.

Figure 4:
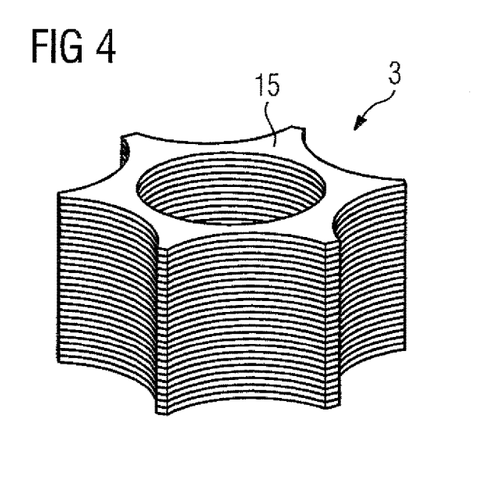
FIG. 4 shows a perspective view of a laminated core of a rotor.

Likewise suitable as the carrier structure 14 is a laminated core 15 of the rotor 3 in accordance with FIG. 4. The laminated core 15 has cutouts or depressions, which each correspond to the shape of the permanent magnets 11 and into which the permanent magnets 11 can thus be inserted in a form fit. Advantageously in such cases the permanent magnets 11 are pre-fixed by an adhesive, wherein the entire rotor 3 is subsequently bandaged during the complete equipping of the rotor 3 or of the carrier structure 14. Inter alia this bandaging guarantees that, even at high speeds, the positioning of its permanent magnets 11 in the motor or generator is guaranteed.

Figure 5:
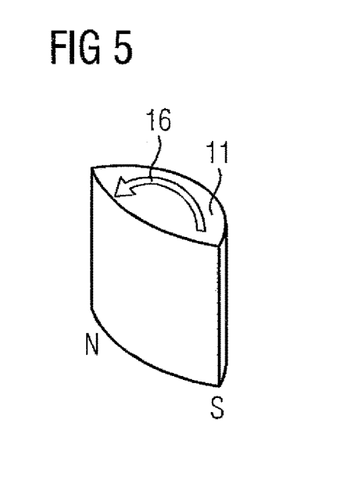
FIG. 5 shows a perspective view of a permanent magnet.

FIG. 5 shows a laterally magnetized permanent magnet 11 with its magnetic preferred direction 16. This lens-shaped magnet body, viewed in this case in cross-section, has two curved surfaces. The surface with the comparatively large radius is in this case the side facing towards the air gap 8 which has the North Pole and South pole. The side embodied with the smaller radius faces towards the laminated core 15 or the carrier structure 14.

Figure 9:
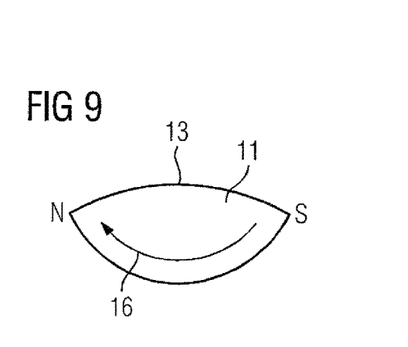
FIGS. 9 to 11 show exemplary embodiment of permanent magnets.
Figure 10:
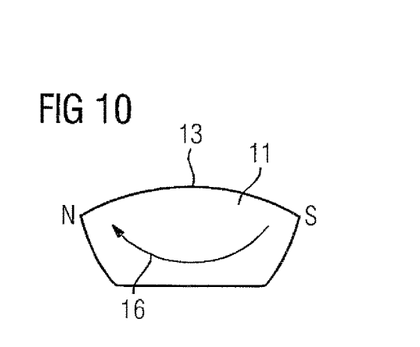

FIG. 9 and FIG. 10 show various embodiments of permanent magnets 11 which will be described in greater detail further below, with the shape of the permanent magnet according to FIG. 10 departing from a strict lens-shaped embodiment of the permanent magnet 11.

Figure 6:
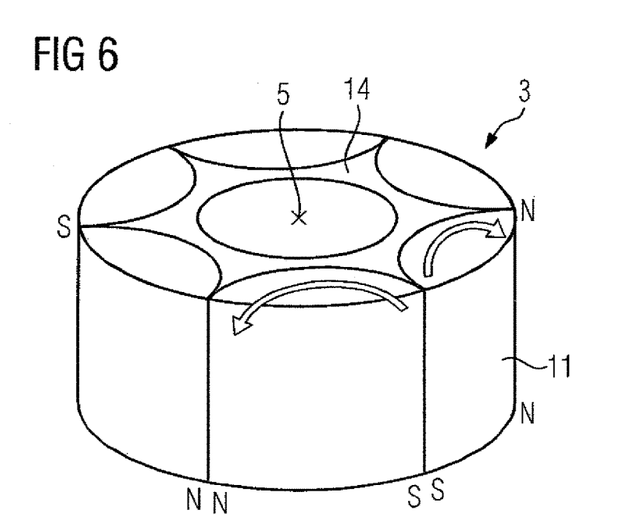
FIG. 6 shows a perspective view of a rotor.

FIG. 6 shows a perspective view of the rotor 3 with permanent magnet 11 on a carrier structure 14. The respective North and South poles N, S of the rotor 3 are disposed at the contact areas of the permanent magnets 11. Each permanent magnet 11 thus has a North pole and the South Pole towards the air gap 8. There is an almost 100% pole coverage.

Figure 7:
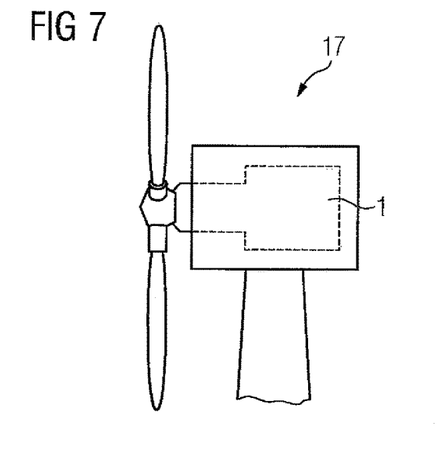
FIG. 7 shows a longitudinal section of a gondola of a wind power plant.

FIG. 7 shows the use of such a dynamoelectric machine 1 in a wind power plant 17. The dynamoelectric machine 1 used as a generator can hereby be driven directly (as direct drive) or via a transmission.

This type of a dynamoelectric machine 1 according to the invention can, as FIG. 7 principally shows in a longitudinal section, be disposed in a gondola of the wind power plant. The dynamoelectric machine 1 of this type has a high polarity which is especially important for directly-driven generators. The dynamoelectric machine 1 is easy to manufacture and has a comparatively high air gap induction in the air gap 8 of the dynamoelectric machine 1, which for its part increases the energy efficiency of the wind power plant.

Figure 8:
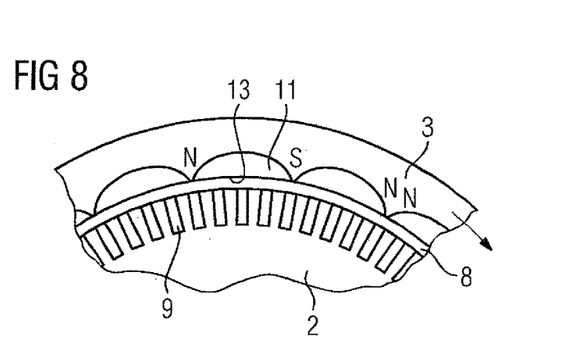
FIG. 8 shows a cross-sectional view of a detail of a dynamo electric machine with external rotor.

FIG. 8 shows a dynamoelectric machine 1, which is embodied as an external armature of a generator or motor. In order to conform to the air gap 8 of the dynamoelectric machine 1, the permanent magnets 11 are no longer embodied lens-shaped but instead sickle-shaped or shell-shaped. Also in this case, the side of the permanent magnet 11 facing away from the air gap 8 is aligned to the preferred direction of magnetization. North and South pole of the permanent magnet 11 point to the air gap 8. The stator 2 in this case is principally provided with grooves 9 in which winding systems are positioned.

FIG. 8 shows by way of example a version of a dynamo-electric machine 1 with an external armature. The inventive idea is adapted to these circumstances, i.e. the winding system of the stator 2 is located on an inner carrier element, wherein the grooves point towards the air gap 8. The permanent magnets 11 are accordingly adapted in their shape (radii) to the demands of the external armature.

FIGS. 9 and 10 show embodiments of a permanent magnet 11 for an internal armature motor, in which the section 13 of the permanent magnet 11 facing towards the air gap 8 is adapted to the radius of the stator bore. The shape of the side of the permanent magnet 11 facing away from the air gap 8 is also preferably rounded, as FIG. 9 shows, but for reasons of the manufacturing process, as shown in FIG. 10, can be embodied trapezoidal in principle. The deciding factor here is that through the lateral magnetization of this magnet 11 no additional return path material has to be provided within the rotor, since both the magnetic polarization and also the magnetic field guidance are undertaken in the permanent magnet 11.

Figure 11:
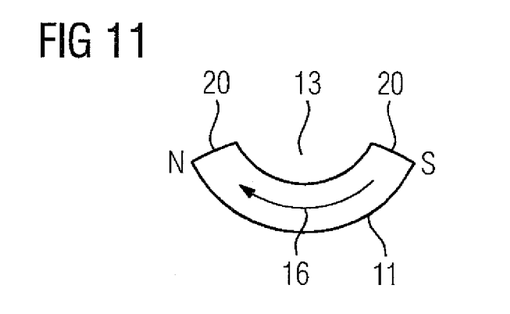

FIG. 11 shows a further embodiment of a permanent magnet 11 for an internal armature motor, in which the section 13 of the permanent magnet 11 facing towards the air gap 8 is embodied concave to the radius of the stator bore. In this case the end sections 20 form the curved shape of the rotor 3.

Figure 12:
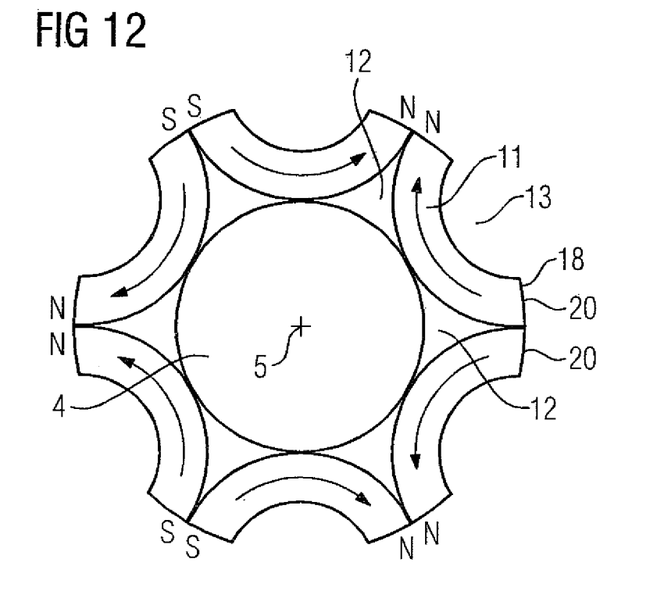
FIG. 12 shows a cross-section of a rotor.

FIG. 12 shows by way of a cross-section of a rotor 3 six poles which are formed by essentially asymmetrical shell-shaped permanent magnets 11 in accordance with FIG. 11. These permanent magnets 11 are likewise laterally magnetized, i.e. in the actual case at the ends the bar magnet. A magnetic pole N or S of the rotor 3 is thus also formed here by two poles of the same name NN or SS of the permanent magnet 11 in contact with one another.

The sections 20 of the permanent magnets 11 are shaped in this case so that a rounded shape is produced which is adapted to the stator bore. In this case an almost constant air gap 8 is produced in the area of these sections 20.

The inventive idea of the laterally magnetized permanent magnets 11 is also suitable for ferrite materials, permanent magnets 11 with rare earth materials and Dysprosium-reduced materials especially neodymium-iron-boron-magnetized materials which are referred to as high-energy magnets. The shape of the permanent magnets 11 depends on the required torque generation, the geometrical dimensions of the stator bore and thus of the rotor 3 and on the required or desired air gap induction.

In order to design the cross-section of the rotor 3 with such permanent magnets 11 in accordance with FIG. 11, round or roundish, advantageously the roundish depressions 13 of these permanent magnets 11 in accordance with FIG. 11 are provided with amagnetic material. This avoids the air resistance or noise emissions above all at high speeds of the rotor 3.

80-pole rotors are provided for example as an application, which above all, because of the low-inertia spoke construction of a carrier structure 14, are able to be used for E-aircraft, E-cars and also for wind power plants. In this context for example E-aircraft, E-car applications are to be seen as aircraft, helicopters, electrically-driven locos, power trains, streetcars, trucks and electrically-driven buses.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A permanently-excited dynamoelectric machine, comprising:
    a rotor supported for rotation about an axis and having a circumference;
    permanent magnets magnetized with a Dysprosium-reduced material disposed on the rotor about the circumference at a pole coverage of 100% in the absence of a gap between adjacent one of the permanent magnets;
    a stator having a winding system embedded in grooves of a material forming a magnetic return path and interacting electromagnetically with the permanent magnets of the rotor via an air gap between the stator and the rotor; and
    a shaft, said rotor having a low-inertia structure in a torsion-proof manner with the shaft to hold, fix and position the permanent magnets,
    wherein the permanent magnets have a lense-shaped configuration elongated in a circumferential direction with a radially outwardly convex outer surface and a radially inwardly convex inner surface and with tips formed between circumferential ends of said radially outwardly and radially inwardly convex outer and inner surfaces, and
    wherein the lense-shaped permanent magnets are arranged so that each of two of circumferentially neighboring lense-shaped magnets contact each other with their tips which form poles of the permanent magnets.

2. The permanently-excited dynamoelectric machine of claim 1, wherein the rotor has a laminated configuration, with the permanent magnets being disposed on its surface.

3. The permanently-excited dynamoelectric machine of claim 1, wherein the permanent magnets have a lens-shaped, trapezoidal or shell-shaped configuration, such that, independently of a number of poles of the rotor, a section of the permanent magnets facing away from the air gap essentially follows a magnetic preferred direction.

4. The permanently-excited dynamoelectric machine of claim 1, wherein the rotor is embodied as a high-pole rotor having more than six poles.

5. The permanently-excited dynamoelectric machine of claim 1, wherein the tips of each two of the circumferentially neighboring permanent magnets form poles selected from the group consisting of same poles and different poles.

6. The permanently-excited dynamoelectric machine of claim 1, wherein
    the rotor has a carrier structure which receives and holds said lense-shaped magnets and is configured as a structure selected from the group consisting of a star-shaped carrier structure and a spike-like carrier structure.

7. A wind power plant, comprising:
a generator including a dynamoelectric machine comprising a rotor supported for rotation about an axis and having a circumference,
permanent magnets magnetized with a Dysprosium-reduced material disposed on the rotor about the circumference at a pole coverage of 100% in the absence of a gap between adjacent one of the permanent magnets,
a stator having a winding system embedded in grooves of a material forming a magnetic return path and interacting electromagnetically with the permanent magnets of the rotor via an air gap between the stator and the rotor, and
a shaft, said rotor having a low-inertia structure in a torsion-proof manner with the shaft to hold, fix and position the permanent magnets;
wherein the permanent magnets have a lense-shaped configuration elongated in a circumferential direction with a radially outwardly convex outer surface and a radially inwardly convex inner surface and with tips formed between circumferential ends of said radially outwardly and radially inwardly convex outer and inner surfaces, and
wherein the lense-shaped permanent magnets are arranged so that each of two of circumferentially neighboring lense-shaped magnets contact each other with their tips which form poles of the permanent magnets.

8. The wind power plant of claim 7, wherein the generator is embodied as an external armature or internal armature and/or is able to be driven as a direct drive or via a transmission.

9. The wind power plant of claim 7, wherein the rotor has a laminated configuration, with the permanent magnets being disposed on its surface.

10. The wind power plant of claim 7, wherein the permanent magnets have a lens-shaped, trapezoidal or shell-shaped configuration, such that, independently of a number of poles of the rotor, a section of the permanent magnets facing away from the air gap essentially follows a magnetic preferred direction.

11. The wind power plant of claim 7, wherein the rotor is embodied as a high-pole rotor having more than six poles.

12. The permanently-excited dynamoelectric machine of claim 7, wherein the tips of each two of the circumferentially neighboring permanent magnets form poles selected from the group consisting of same poles and different poles.

13. The permanently-excited dynamoelectric machine of claim 7, wherein
the rotor has a carrier structure which receives and holds said lense-shaped magnets and is configured as a structure selected from the group consisting of a star-shaped carrier structure and a spike-like carrier structure.

14. A drive for an electrically-driven aircraft or an electrically-driven motor vehicle such as an E-car or an electric traction vehicle, comprising:
a dynamoelectric machine including a rotor supported for rotation about an axis and having a circumference,
permanent magnets magnetized with a Dysprosium-reduced material disposed on the rotor about the circumference at a pole coverage of 100% in the absence of a gap between adjacent one of the permanent magnets,
a stator having a winding system embedded in grooves of a material forming a magnetic return path and interacting electromagnetically with the permanent magnets of the rotor via an air gap between the stator and the rotor, and
a low-inertia structure in a torsion-proof manner with the shaft to hold, fix and position the permanent magnets,
wherein the permanent magnets have a lense-shaped configuration elongated in a circumferential direction with a radially outwardly convex outer surface and a radially inwardly convex inner surface and with tips formed between circumferential ends of said radially outwardly and radially inwardly convex outer and inner surfaces, and
wherein the lense-shaped permanent magnets are arranged so that each of two of circumferentially neighboring lease-shaped magnets contact each other with their tips which form poles of the permanent magnets.

15. The drive of claim 14, wherein the rotor has a laminated configuration, with the permanent magnets being disposed on its surface.

16. The drive of claim 14, wherein the permanent magnets have a lens-shaped, trapezoidal or shell-shaped configuration, such that, independently of a number of poles of the rotor, a section of the permanent magnets facing away from the air gap essentially follows a magnetic preferred direction.

17. The drive of claim 14, wherein the rotor is embodied as a high-pole rotor having more than six poles.

18. The permanently-excited dynamoelectric machine of claim 14, wherein the tips of each two of the circumferentially neighboring permanent magnets form poles selected from the group consisting of same poles and different poles.

19. The permanently-excited dynamoelectric machine of claim 14, wherein
the rotor has a carrier structure which receives and holds said lense-shaped magnets and is configured as a structure selected from the group consisting of a star-shaped carrier structure and a spike-like carrier structure.

* * * * *